United States Patent [19]

Abbott et al.

[11] Patent Number: 4,574,658
[45] Date of Patent: Mar. 11, 1986

[54] PLANETARY FINAL DRIVE

[75] Inventors: Seth C. Abbott, Lexington; James J. Connerley, Georgetown; Arthur W. Klok, Jr., Lexington, all of Ky.

[73] Assignee: FMC Corporation, Chicago, Ill.

[21] Appl. No.: 530,150

[22] Filed: Sep. 7, 1983

[51] Int. Cl.⁴ ............................................. F16H 57/10
[52] U.S. Cl. ......................................... 74/785; 74/801
[58] Field of Search .................. 74/801, 797, 785, 788

[56] References Cited

U.S. PATENT DOCUMENTS

| | | | |
|---|---|---|---|
| 1,872,541 | 9/1932 | White | 74/801 X |
| 2,978,051 | 4/1961 | Risk et al. | 74/801 X |
| 2,984,122 | 5/1961 | Woolley | 74/788 X |
| 3,387,502 | 6/1968 | Tourneau | 74/801 X |
| 3,518,897 | 7/1970 | Bixby | 74/801 X |
| 4,114,479 | 9/1978 | Ashfield | 74/801 |
| 4,392,396 | 7/1983 | Sato et al. | 74/801 X |

Primary Examiner—William F. Pate, III
Assistant Examiner—Dwight G. Diehl
Attorney, Agent, or Firm—Richard B. Megley; Ronald C. Kamp

[57] ABSTRACT

A planetary final drive having an output shaft journaled in a two-part housing with a compound gear consisting of a sun gear and a spur gear supported by a bearing on the output shaft. The spur gear engages and is driven by a powered pinion gear, and the sun gear engages and drives the planet gears in the planet carrier; the latter gears engage a ring gear grounded to the housing. Spacer means carried by said output shaft locate the bearing and maintain it under the spur gear, and preclude relative axial movement of the compound gear relative to the carrier.

1 Claim, 1 Drawing Figure

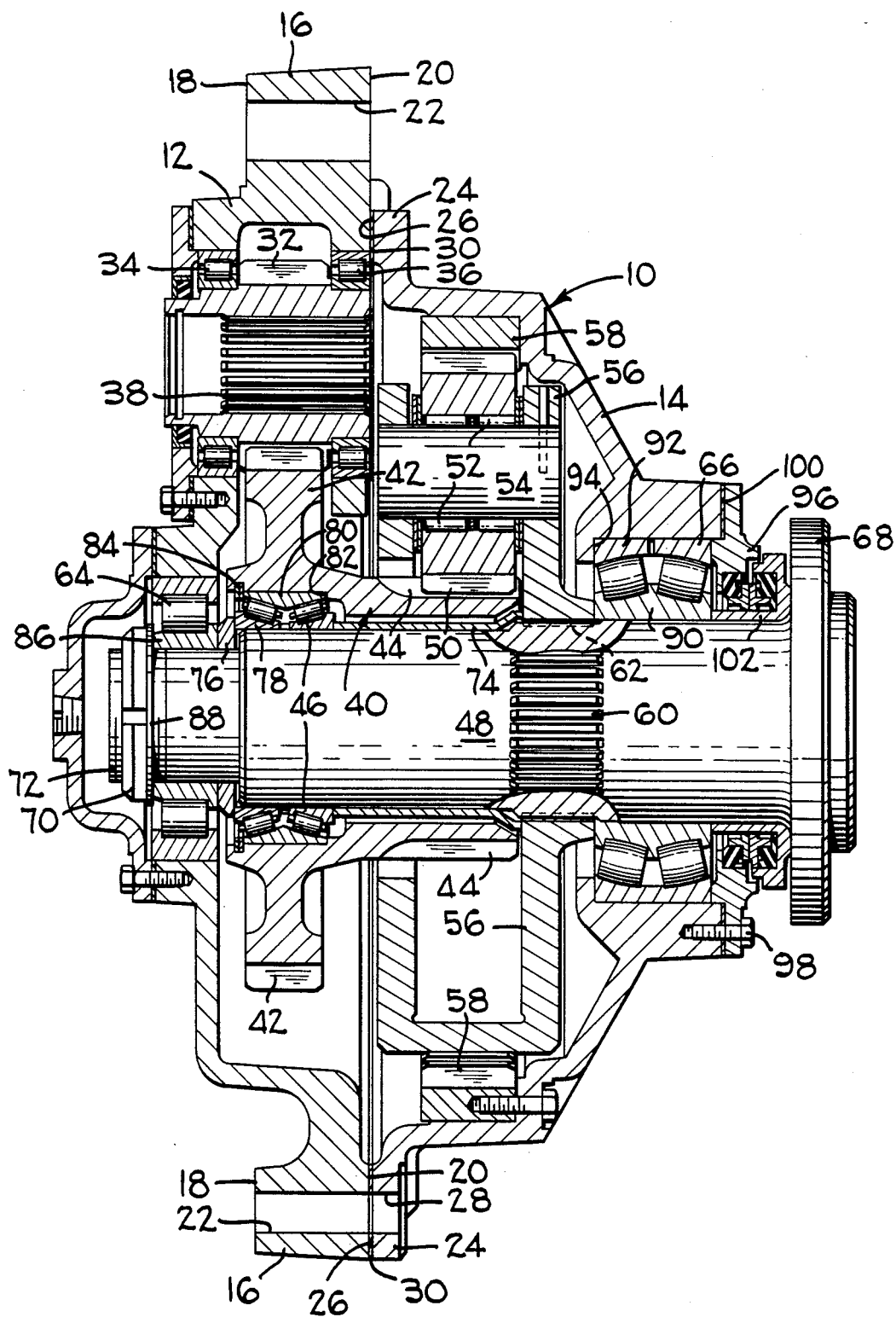

PLANETARY FINAL DRIVE

The present invention relates to planetary final drives, and more particularly, to such drives in which the power input thereto is offset with respect to the output.

This invention comprises a planetary final drive having a power input to the planetary through a compound gear having a spur gear section driven by a pinion gear and a sun gear section driving the planet gears on the planet carrier of the final drive. The compound gear is rotably supported by a bearing on the output shaft, which bearing is secured under the spur gear section to preclude separation between the pinion gear and the spur gear and to achieve a more uniform loading. This arrangement provides a planetary final drive which is compact in size, which permits the use of a housing separable into only two sections, and which is relatively economical to manufacture and easy to service.

The sole figure of the drawing is a cross sectional view taken on a vertical plane through the center thereof, with portion broken away for clarity.

Referring to the drawing, the planetary final drive includes a housing, indicated generally at 10, which is split into two portions or members; an inboard member 12 and an outboard member 14. The inboard member 12 has a flange 16 forming inboard and outboard flat surfaces 18 and 20 respectively with a plurality of circumferentially spaced holes 22 extending through the flange 16. The outboard member 14 also has a flange 24 forming a flat surface 26 which is complementary to and engageable with the outboard surface 20. A plurality of holes 28 extend through the flange 24 and are alignable with certain ones of the holes 22 in the flange 16. Bolts, not shown, extend through the aligned holes 22 and 28 and threadedly engage tapped holes formed in the chassis of a vehicle to secure the housing 10 to the chassis and to clamp and secure the two members 12 and 14 together. Additional bolts may also be utilized to secure the two members 12 and 14 directly together. The gasket 30, positioned between the surfaces 20 and 26, is utilized to prevent leakage of lubricant from between the members 12 and 14.

Pinion 32 is rotably mounted in the inboard member 12 by a pair of roller bearings 34 and 36. Pinion 32 has an internally splined bore 38 which is engagable with a complementary, externally splined stub shaft, not shown, which is connected in a conventional manner to the vehicles prime mover to supply rotary power to the pinion 32. A compound gear 40 having a spur gear section 42 and a sun gear section 44 is mounted on a double tapered roller bearing 46 carried by the output shaft 48. Spur gear 42 engages, and is driven by the pinion gear 32. Sun gear 44 engages the planet gears, one of which is shown at 50. Each of the planet gears 50 is rotably mounted by a needle bearing 52 on a shaft 54 secured to the planet carrier 56 and engages a ring gear 58 secured to the outboard member 14. Since the outboard member 14 is attached to the vehicle chassis, ring gear 58 is grounded and the output is through the carrier 56 to the output shaft 48 through a spline connection therebetween; the output shaft having an exterior spline 60 engaging the interior spline 62 formed in a central bore of the carrier 56.

The output shaft 48 is rotably supported by a roller bearing 64 mounted in the inboard member 12 and by a double spherical roller bearing 66 mounted in the outboard member 14. Bearing 66 accommodates small axial misalignments resulting from manufacturing tolerances and resists axial loads imposed on the shaft 48. A flange 68 is formed on the outboard end of the shaft 48 and provides a convenient means for connection of the wheel or sprocket to be driven by the output shaft 48. The flange 68 also functions with a nut 70 engaging a threaded end portion 72 formed on the inboard end of shaft 48 to maintain bearing 46 in its proper position. The following paragraph provides a brief explanation of the reason such positioning is important.

Only pinion 32 is in engagement with spur gear 42, and consequently the loads resulting from tooth pressure angles tend to cause separation between the pinion 32 and spur gear 42. Pinion 32 is, however, supported at each end by bearings 34 and 36, and is therefore relatively rigid. The loads tending to separate the pinion 32 and spur gear 42 will therefore be more likely to force the spur gear 42 downward, canting the compound gear 40 at an angle relative to the output shaft 48 and resulting in an intolerable angular misalignment between the pinion section 44 and the planet gears 50. It is to be understood that the sun gear 44 does not experience a similar separation tendency because there are a plurality of planet gears 50 spaced at equal angles around the periphery of the sun gear 44, resulting in force vectors which tend to balance each other. In order to preclude the deflection or canting of the compound gear 40, it is necessary to center the bearing 46 under the spur gear 42 and to maintain the bearing in that position with the sun gear portion of the compound gear cantilevered over the output shaft 48. The sun gear 44, which is a driving gear, is preferably wider than the planet gears 50. To maintain a minimum clearance between the carrier 56 and the outboard end of the sun gear, it is necessary to insure that the compound gear 40 and the carrier 56 are properly located and secured against axial movement relative to each other.

These objectives are achieved by positioning tubular spacers 74 and 76 over the shaft 48 on each side of the inner race 78 of bearing 46. The outboard spacer 74 contacts the carrier 56. The outer race 80 of bearing 46 is trapped between an interior shoulder 82 of the spur gear and a retainer ring 84 positioned within a groove in the spur gear. Contact between the end of the sun gear 44 and the carrier 56 is thereby precluded and the distance therebetween maintained at a minimum consistent with acceptable manufacturing tolerances. The inboard spacer 76 contacts the inner race 86 of bearing 64, which race in turn is in contact with a lockwasher 88 held by the nut 70 on the threaded end 72. The carrier 56 contacts the inner race 90 of bearing 66, the outer race 92 of which is trapped between an interior shoulder 94 formed in the outboard member 14 and a retainer 96 secured to the member 14 by bolts 98. Shims 100 may be provided between the retainer 96 and the member 14, as necessary, to preclude imposing a preload on the spherical bearing 66. The seal spacer 102 engages the inner surface 90 and the flange 68 of the output shaft 48. The proper positioning of the components is therefore determined with all axial loads being resisted by the bearing 66.

While the best mode of practicing the present invention has been shown in the drawing and described herein, it will be appreciated that various changes and modifications may be made therein without departing from the spirit of the invention as defined by the scope of the appended claims.

What is claimed is:

1. A planetary final drive comprising: a housing; a ring gear secured to said housing; inboard and outboard bearings, each of which has inner and outer races, mounted in said housing; and output shaft having a flange on one end and threaded at the other end rotatably mounted in said bearings; a planet carrier splined to said output shaft; a compound gear having a spur gear and a sun gear; a mounting bearing having an inner race carried by said shaft and an outer race axially centered with said spur gear and the sun gear cantilevered over said shaft; a plurality of planet gears rotatably mounted on said carrier and engaging said sun and ring gears; a tubular spacer positioned over said shaft and being continuously radially spaced inwardly from said compound gear, having its one end engaging the inner race of said mounting bearing and its other end directly engaging said carrier adjacent its splined connection to said output shaft; a second spacer positioned on said shaft between and contacting the inner race of each of said inboard and mounting bearings; a third spacer positioned on said shaft between and contacting the inner race of said outboard bearing and said flange; and a nut engageable with said threaded end; whereby when said nut is tightened on said threaded end, said inner race of said inboard bearing is forced against said second spacer which is forced against the inner race of said mounting bearing which is forced against said tubular spacer which is forced against said carrier to form a unitary structure and properly position said carrier relative to said compound gear.

* * * * *